May 27, 1969  C. A. ALDRIDGE  3,446,124
APPARATUS FOR PRODUCING PROJECTION SLIDES
Filed March 22, 1966
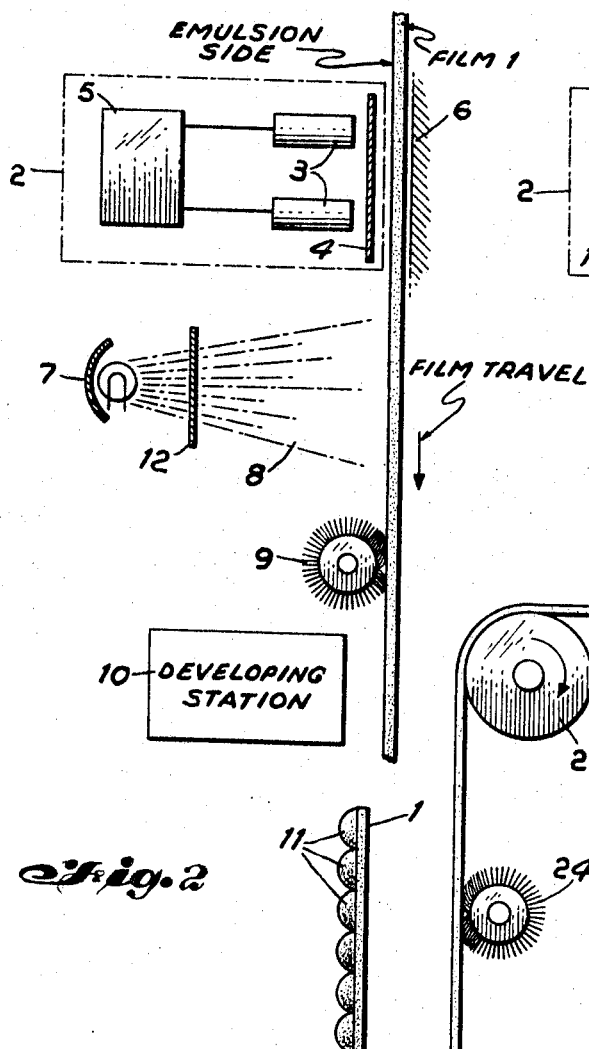
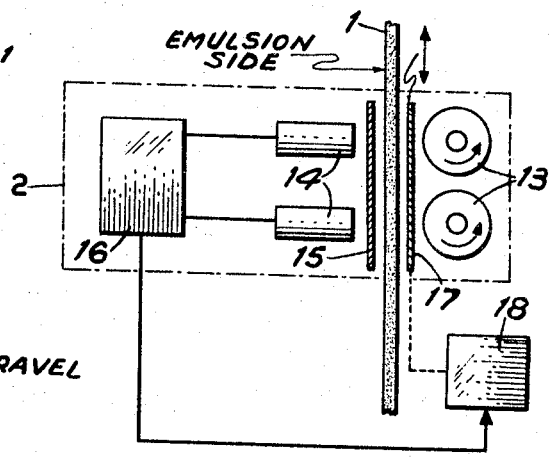
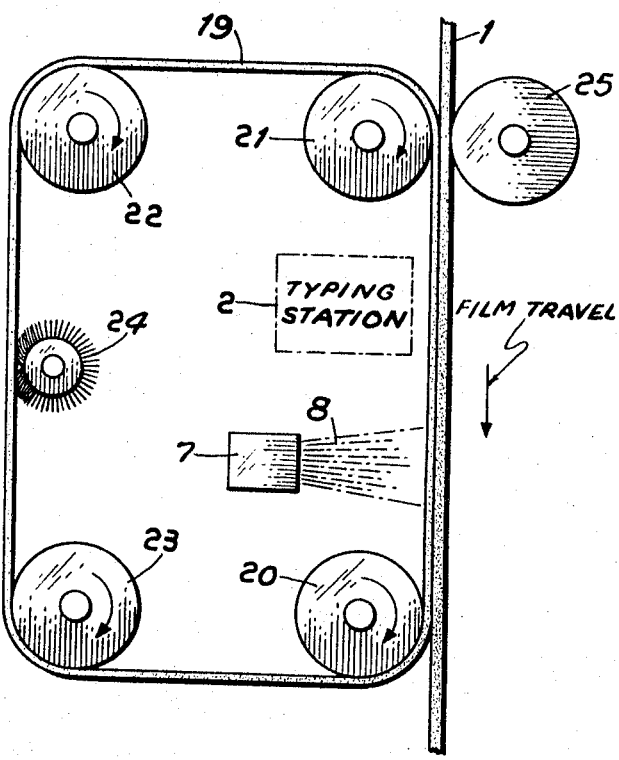
INVENTOR.
CHARLES A. ALDRIDGE
BY Philip M. Bolton
ATTORNEY

United States Patent Office 3,446,124
Patented May 27, 1969

3,446,124
APPARATUS FOR PRODUCING PROJECTION SLIDES
Charles A. Aldridge, Paramus, N.J., assignor to International Telephone and Telegraph Corporation, Nutley, N.J., a corporation of Maryland
Filed Mar. 22, 1966, Ser. No. 536,445
Int. Cl. G03b 27/32, 29/00
U.S. Cl. 95—1                14 Claims

ABSTRACT OF THE DISCLOSURE

Apparatus for producing projection slides wherein a light absorbing material forming a desired symbol is secured to the emulsion side of a sheet of photosensitive film. The film is then bulk exposed to light, the light absorbing material preventing said light from exposing the emulsion on the portions covered by said symbol. After exposure, apparatus is provided for removing the light absorbing material and then to develop the film, thereby producing a projection slide.

---

This invention relates to apparatus for producing projection slides and more particularly to apparatus for producing projection slides having light symbols on a dark background from photosensitive films.

Photosensitive films are presently available which have the desirable characteristics of very high resolution and excellent grey scale. These films, when utilized in a properly designed projection system, can provide excellent contrast ratios. In producing projection slides it is desirable to have light symbols on a dark background. An advantage of this configuration is that such symbols have a higher legibility than dark symbols on a light background. Another advantage of this configuration is that color filters may be placed in front of the objective lens of the projection system or in front of the slide itself to project colored symbols on said dark background. Still another advantage is that when superimposing said light symbols on an independently projected image, there is substantially no dilution of the colors or "washing out" of said independently projected image.

Previously projection slides having light symbols on dark backgrounds have been produced by interposing an intermediate negative having an opaque light absorbing symbol thereon between the photosensitive film and the exposing source, said exposing source substantially equally exposing the complete surface of said film. Hereinafter, this type of exposure will be referred to as "bulk exposure." In this manner the areas of said film shielded from said exposing source by the symbol on said negative remain unexposed. The exposed film is then developed, producing a projection slide having light symbols on a dark background. A drawback to this method is that the intermediate negative must be prepared beforehand, thereby making the system undesirable in applications where one wishes to produce projection slides quickly from information just received.

Therefore, it is the main object of this invention to provide a simplified system from producing projection slides from received information of photosensitive film, which may be random in nature, said slides having light symobls on a dark background.

According to this invention a light absorbing material forming a desired symbol is secured to the emulsion side of a sheet of photosensitive film. Said film is then bulk exposed to light (i.e., light is equally applied over the entire surface thereof), the light absorbing material preventing said light from exposing said emulsion on the portions covered thereby. After exposure, means are provided for removing the light absorbing material from the film and then to develop said film thereby producing a projection slide having light characters on a dark background.

The above-mentioned and other objects of this invention will become apparent by reference to the following description taken in conjunction with the accompanying drawings, in which:

FIGURE 1 is a schematic block diagram of a system according to this invention;

FIGURE 2 is a schematic illustration of a developed sheet of ultraviolet light sensitive film;

FIGURE 3 is a schematic block diagram of a modified symbol printer compatible with the instant invention;

FIGURE 4 is a schematic block diagram of another embodiment of this invention; and FIGURE 5 illustrates the use of a computer operated printer in conjunction with the instant invention.

The instant invention will be discussed in detail below with reference to slides produced from dry processible, ultra-violet light sensitive film (such as Kalvar), but it should be clear that the techniques described may be substantially used with other types of photosensitive films.

FIGURE 1 illustrates an embodiment of this invention wherein a strip of ultra-violet light sensitive film 1 (such as Kalvar film) is moved along a predetermined path from one process to the next, in a conveyor belt fashion. The means for supplying this motion is not shown in the interest of clarity. First the film 1 is moved to a symbol typing station 2 which is shown as two type hammers 3 having symbols engraved on their impact surfaces and a ribbon 4 impregnated with the light absorbing material interposed between said hammers 3 and the emulsion side of said film 1. Actually a plurality of such hammers may be used but only two are shown for the sake of clarity. The hammers 3 are selectively propelled against said ribbon 4, film 1 and backing plate 6 by standard state-of-the-art techniques (shown as block 5), resulting in opaque light absorbing symbols being printed on the emulsion side of said film 1. The film 1 is then exposed to ultra-violet radiation from the side thereof having the imprinted light absorbing symbols by means of ultra-violet light source 7.

The opague light absorbing symbols imprinted on said emulsion prevent the ultra-violet light 8 from reaching and exposing the photosensitive molecules on the portions of the film covered thereby. The film 1 is then moved to a cleaner 9 (for example, a cleaning brush 9) which removes the imprinted symbols from the film. It should be clear that any other suitable cleaning device may be used for this purpose. The film 1 is then moved to a developing station 10 where it is developed by means of infrared radiation. When ultra-violet light sensitive film (such as Kalvar film) is used, a surface having many tiny gas bubbles 11 (FIG. 2) is produced wherever said film was exposed to ultra-violet light 8. No gas bubbles are formed where said ultra-violet light 8 was blocked from reaching said film 1 by said opaque light absorbing symbols. These tiny gas bubbles 11 are highly light scattering to incident collimated light and substantially no such light incident on said bubbles 11 is transmitted through said film. Where no gas bubbles are present (i.e., where the symbols were secured to said film 1) light is efficiently passed through and focused onto the projection means. As a result, the projected image consists of bright symbols upon a dark background. Where standard types of photosensitive films are utilied, dark areas are formed where said film is exposed to a light source and light areas are formed where said light is absorbed by said symbols. Therefore, when such a slide is placed in a projection system the light impinging upon the dark areas is not passed through to the objective lens, thereby producing a dark background. The areas where said film was protected from exposure by said symbols will be light and therefore will pass the light from the projector therethrough. Again, what results are slides having light symbols upon a dark background. By placing colored filters in front of the objective lens of the projection system, bright, colored characters may be formed on said dark background.

It is apparent that the instant invention may also be used with other types of films (either wet or dry processible). In such a case it is also apparent that the exposing means (elements 7 and 8, FIGURE 1) and the developing station 10 must be modified accordingly. These modifications to the instant device may be made by one having ordinary skill in the art.

After said film 1 is developed it may either be moved to a projection station and projected onto a screen or said film may be moved on to a device which slices off the section of film containing the symbols. This film chip may then be either manually inserted into a projection system or stored away for later use.

The system of FIGURE 1 may also be used for superimposing symbols on a background map or other predetermined background image. This is accomplished by placing a transparent negative of the background map or other image 12 in front of the exposing source 7 as shown in FIGURE 1. First, the desired symbols are printed on said film at printing station 2. The film is then moved in front of exposing source 7 with said negative being interposed therebetween. The film is then cleaned and developed as previously described and a slide of said background map or image having light symbols superimposed thereon at predetermined positions is produced.

In FIGURE 3 a modification of the symbol typing station 2 of FIGURE 1 is shown in which hammers 14 are slidably mounted on the emulsion side of said film 1. Interposed between said film 1 and said hammers 14 is a ribbon 15 impregnated with ultra-violet light absorbing material. On the other side of said film 1 rotating character wheels 13 are mounted opposite said hammers 14. Said hammers 14 are selectively caused to impact said film 1, said ribbon 15 and said wheels 13 by standard state-of-the-art means 16 at the instant when the desired characters on said rotating character wheels 13 are opposite said hammers 14. In this manner opaque symbols of ultra-violet light absorbing material are printed on the emulsion of said film 1. The film 1 is then processed in the same manner as shown in FIGURE 1 to produce a projection slide therefrom. Normally a plurality of pairs of character wheels 13 and timing hammers 14 would be used, but only two are shown in FIGURE 3 for the sake of clarity.

A further modification of the symbol typing station 2 of FIGURE 3 is to place a ribbon 17 impregnated with transparent colored inks between said film 1 and said character wheels 13. In this type of system when said hammers 14 are propelled against said film 1, said ribbons 15 and 17 and said wheels 13, opaque symbols of ultra-violet light absorbing material are printed on the emulsion side of said film 1 and corresponding transparent colored symbols are printed on the other side of said film 1. The film is then processed in the same manner as shown in FIGURE 1 to produce a projection slide therefrom. It should be noted that at the cleaning station 9 of FIGURE 1 only the light absorbing symbol is removed. The colored symbol printed on the other side of said film is not removed therefrom. What remains after development is a projection slide having colored images on a dark background. This produces essentially the same end results as placing a colored filter in front of a projection slide produced in the normal manner. It should be noted that ribbon 17 may further be modified by having multicolored sections thereon and having means for placing the appropriately colored portions thereof in front of said character wheel at the desired instants of time. This may be accomplished by means of element 18 of FIGURE 3 which receives information from propelling means 16 and places the appropriately colored portions of ribbon 17 in the desired position in front of character wheels 13. In this manner different colored symbols may be produced on the resulting slide. The design of element 18 and the coupling thereto from propelling means 16 can be carried out by one reasonably skilled in the art.

It should be noted that other variations of printing station 2 may also be utilized by one reasonably skilled in the art. For example, the positions of the hammers 14 and wheels 13 of FIGURE 3 may be reversed. In such a case, character wheels having the mirror image of the symbols on character wheels 13 will be required.

FIGURE 4 is a schematic illustration of another embodiment of the instant invention. In this embodiment a thin transparent sheet 19 of acetate or Mylar or any other suitable material in the form of an endless belt is secured to the emulsion side of said film 1 by means of pressure rollers 21 and 25. Now, when said film 1 is moved to the printing station 2 the symbols are printed on said transparent sheet 19 instead of directly on the emulsion of said film 1. The film 1 is then bulk exposed to ultra-violet radiation as described herein with reference to FIGURE 1, the film being protected from exposure on the portions thereof covered by said light absorbing symbols. After exposure of the film 1 the transparent sheet 19 is removed from said film by means of roller 20. Said sheet 19 is then fed to cleaning brush 24 by means of rollers 22 and 23 and resecured to said film by means of pressure rollers 21 and 25 ahead of said typing station 2. The film is then developed in the manner previously described in order to produce a projection slide therefrom. An advantage of this embodiment over the one shown in FIGURE 1 is that the possibility of damaging the film during the cleaning operation is minimized.

It should be noted that the invention is no limited to the embodiments shown and described herein. For example, it is pointed out that the printing stations 2 shown in the drawings as simple printing methods could be replaced by a high speed typewriter or a high speed computer operated printer. FIG. 5 illustrates the use of a high speed printer 26 operated by a computer 27. When such a high speed computer operated printer 26 is used the system is capable of producing slides very quickly from information received directly from computer 27. This represents a great improvement over the prior art in that slides can be instantly produced from received information.

While I have described above the principles of my invention in connection with specific apparatus, it is to be clearly understood that this description is made only by way of example and not as a limitation to the scope of my invention as set forth in the accompanying claims.

What is claimed is:

1. Apparatus for producing projection slides utilizing a sheet of photo-sensitive film comprising:
    means positioned opposite the emulsion side of said film for applying a selected one of a plurality of light absorbing symbols to the emulsion side of said film;
    means for bulk exposing the entire emulsion side of said film after said symbols are applied;
    means for removing said symbols after exposing of said film; and
    means for developing said film after removal of said light absorbing symbols.

2. Apparatus according to claim 1 wherein said means for removing comprises a rotating cleaning brush.

3. Apparatus according to claim 1 wherein said means for applying comprises a high speed printer for applying said light absorbing symbols.

4. Apparatus according to claim 1 wherein said means for applying comprises a plurality of hammers slidably mounted opposite said film for applying said light absorbing symbols.

5. Apparatus according to claim 4 wherein said slidably mounted hammers have the impressions of desired symbols on the impact surfaces thereof.

6. Apparatus according to claim 5 wherein said hammers are mounted opposite the emulsion side of said film and further comprising:
   a ribbon impregnated with light absorbing material mounted between said impact surfaces of said hammers and said film;
   a stationary backing plate mounted opposite said hammers on the other side of said film;
   means for selectively propelling said hammers against said ribbon, said film, and said plate to apply said light absorbing symbols to the emulsion side of said film.

7. Apparatus according to claim 1 wherein said means for applying comprises a plurality of character wheels having the impressions of characters formed around the peripheries thereof rotatably mounted opposite said film for applying said light absorbing symbols.

8. Apparatus according to claim 5 wherein said character wheels are mounted opposite the non-emulsion side of said film and further comprising a plurality of hammers slidably mounted opposite the emulsion side of said film, each said hammer being mounted opposite a character wheel.

9. Apparatus according to claim 8 further comprising:
   a ribbon impregnated with light absorbing material mounted between said hammers and said film; and
   means for causing selected ones of said hammers to be propelled against said ribbon, said film and said character wheels at the desired instants of time for applying light absorbing symbols to said film.

10. Apparatus according to claim 1 further comprising a ribbon impregnated with transparent colored material mounted opposite the non-emulsion side of said film.

11. Apparatus according to claim 10 wherein said colored ribbon has multicolored elements thereon and further comprising means for selectively interposing selected elements thereof between said film and said means for applying.

12. Apparatus according to claim 1 further comprising a thin sheet of transparent material secured to the emulsion of said film.

13. Apparatus according to claim 12 wherein said means for removing comprises means for removing said transparent material from said film.

14. Apparatus according to claim 13 wherein said transparent sheet is an endless belt and said means for removing further comprises:
   means for removing said symbols from said transparent sheet after said sheet is removed from said film; and
   means for securing said cleaned transparent sheet to said film at a point thereon before said symbols are applied.

References Cited
UNITED STATES PATENTS

| | | | |
|---|---|---|---|
| 1,358,990 | 11/1920 | Scannell | 95—1.1 |
| 1,432,676 | 10/1922 | De Brayer | 95—1.1 |
| 2,589,696 | 3/1952 | Horsky | 95—1.1 |

NORTON ANSHER, *Primary Examiner.*

R. M. SHEER, *Assistant Examiner.*